June 5, 1956 B. V. VONDERSCHMITT 2,749,475

TV VERTICAL DEFLECTION CIRCUIT

Filed Nov. 2, 1953 2 Sheets-Sheet 1

INVENTOR.
BERNARD V. VONDERSCHMITT

BY [signature]

ATTORNEY

TV VERTICAL DEFLECTION CIRCUIT

Filed Nov. 2, 1953 2 Sheets-Sheet 2

INVENTOR.
BERNARD V. VONDERSCHMITT
BY [signature]
ATTORNEY 2,749,475

TV VERTICAL DEFLECTION CIRCUIT

Bernard V. Vonderschmitt, Merchantville, N. J., assignor to Radio Corporation of America, a corporation of Delaware Application November 2, 1953, Serial No. 389,575

9 Claims. (Cl. 315—24)

This invention relates in general to deflection circuits for cathode ray tubes and more especially to apparatus for improving the efficiency of deflection circuits of display tubes in color television receivers.

In conventional monochrome television receivers, electromagnetic deflection for the kinescope is often employed. A deflection yoke which includes vertical and horizontal deflection coils is used to supply the necessary deflection fields to the cathode ray tube or kinescope. The coils for the horizontal and vertical deflection are mounted physically close to one another in the deflection yoke so that a certain amount of capacity is present between the two sets of windings. In ordinary monochrome television receivers, losses due to this capacity are not serious.

With some modern color television kinescopes, such as the "Three Gun Shadow Mask" type which has been well described and explained in Part II of the RCA Review for September 1951 at page 466, et. seq., a deflection yoke is used which is larger than monochrome yokes. It is so constructed that when the neck of the tricolor kinescope is inserted through it there is more clearance between the neck and the interior surface of the yoke at all points than exists in monochrome yokes. This design permits greater latitude of adjustment, but since the coils are further from the cathode ray in the tube, more power is required to create a stronger field. As a result the effective area between windings is increased and thus the capacitance existing between the horizontal and vertical sections of the yoke becomes 4 or 5 times greater than that of monochrome yokes.

If the vertical winding is returned through the vertical centering potentiometer to A.-C. ground, this additional capacity results in excessive increase in the retrace time of the horizontal deflection circuit, loss of high voltage and excessive ringing resulting in excessive vertical displacement which may cause a so-called "rainbow effect" to be explained later.

According to one form of this invention, inductances are placed intermediate the vertical deflection windings and the vertical centering potentiometer. In one form of the invention, the inductances may take the form of a low capacity bifilar transformer. With respect to A.-C. the inductances isolate the vertical winding from ground. The vertical winding thus becomes a high impedance so far as the horizontal frequencies are concerned. At the same time a means is provided for supplying vertical centering current to the vertical windings. In another form, inductances may be placed in series with the horizontal windings permitting D.-C. to be applied to the horizontal windings.

A principal object of the invention is to prevent interaction between the currents in windings of deflection circuits for electromagnetically deflected cathode ray tubes.

It is also an object of the present invention to improve the performance of the horizontal deflection circuit by preventing excessive retrace time of the horizontal sawtooth.

Still another object of the invention is the prevention of undue loss of anode voltage derived from the horizontal deflection circuit in color television receivers.

A further aim is to improve the efficiency of the high voltage power supply in color television receivers.

Another object is to provide a means for preventing vertical displacement of the horizontal lines at the left hand edge of the raster.

Still another object is to provide a method of supplying centering current to the vertical windings of a color kinescope yoke without interaction from, or with, the horizontal deflection windings.

Another purpose of the invention is to provide a method of supplying centering current to the horizontal deflection windings of a color kinescope.

Other objects of the invention will become apparent from a reading of the following specification together with the drawings in which.

Figure 1:
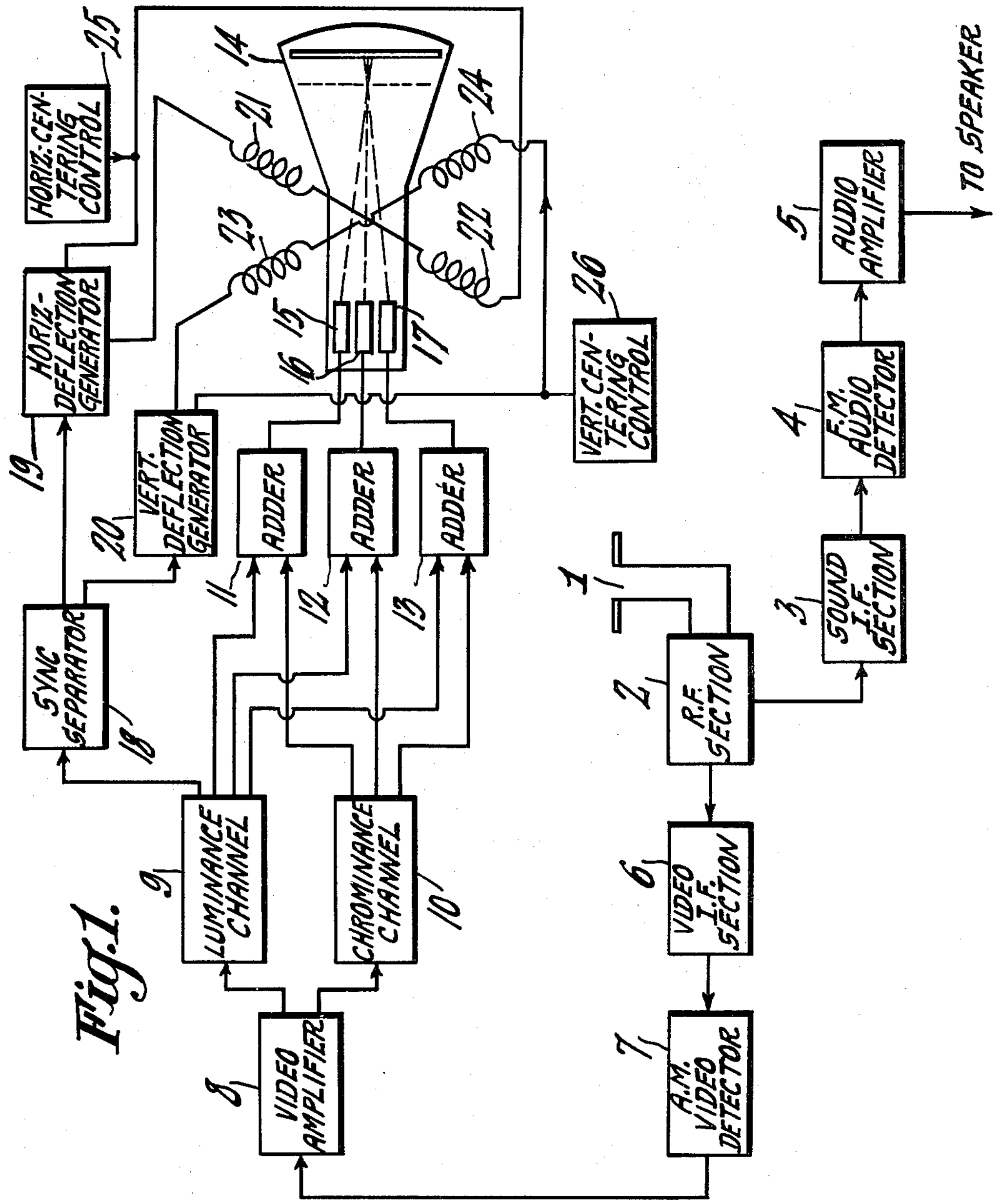
Figure 1 is a block diagram of a typical color television receiver.

Referring to Figure 1, signals are received by antenna 1 and applied to the R. F. section 2 which may include means for heterodyning the incoming signals with local oscillations so as to produce two difference frequencies which carry the modulations for the video and audio sections of the receiver respectively. The difference frequency for the audio section of the receiver is fed from the R. F. section 2 to the sound I. F. section 3 where it is amplified. The amplified, sound-modulated I. F. carrier is then applied to FM audio detector 4 which effectively removes the audio information from the carrier and applies it to audio amplifier 5 which drives the output stage which may be a loudspeaker, for example.

The video modulated intermediate frequency produced in R. F. section 2 is applied to video I. F. section 6 where it is amplified. The output of section 6 is applied to an AM video detector 7 where the picture information is extracted. The picture information is then applied to video amplifier 8 which may consist of one or more stages of amplification.

Assuming that the video signals originally were produced to conform with specifications adopted by the NTSC (National Television System Committee) which appear at page 190, et. seq., of the "RCA Review" for June 1953, the output of amplifier 8 will be diverted into two paths. A 4 mc. wide band of signal frequencies, known as the "Y" signal, containing the luminance components of the televised object, is filtered out of the composite video signal and applied to luminance channel 9. The Y signal is ordinarily amplified and delayed in the luminance channel 9. The sync and blanking pulses are also retained in the Y signal.

A more limited band of signal frequencies is filtered from the composite video signal appearing in the output of amplifier 8. In the chrominance channel 10 the filtered, limited band is detected by means of so-called "synchronous demodulators." The latter consist of means for homodyning the filtered band with two different phases of a locally generated set of oscillations, having the same frequency as a subcarrier on which the chrominance information was originally impressed. As a result of the homodyning action, so-called "color difference" signals for the green, red and blue components of the televised object are obtained. The color difference signals are filtered in channel 10 and then each is applied to adders 11, 12 and 13. The luminance signal from channel 9 is also applied to each of these adders. As a result of the electrical addition performed by each of the adders 11, 12 and 13, color signals for red, blue and green are produced by them respectively and applied to the input of a display means such as a three gun "shadow mask" color kinescope 14 referred to above.

To deflect properly the three electron beams generated by the three guns 15, 16 and 17 of kinescope 14, the synchronizing and blanking information contained in the luminance channel must be utilized. A sync separator 18 is adapted to receive another portion of the output of channel 9. The sync signals for horizontal and vertical deflection are then employed to actuate horizontal deflection generator 19 and vertical deflection generator 20. The latter supply the necessary waves to drive the horizontal windings 21 and 22 and the vertical windings 23 and 24 respectively. Horizontal centering control 25 is coupled to the windings 21 and 22 for providing D. C. for centering purposes. Its exact placement in certain types of deflection systems is indicated in greater detail in Figure 3. It may include circuitry containing a potentiometer for supplying the D. C. A vertical centering control 26 is coupled to vertical windings 23 and 24 for a similar purpose and its relation to the kinescope deflection circuit is indicated more particularly in Figure 2.

The other parts of the kinescope 14 are not shown inasmuch as they are not pertinent to this invention. Figure 1 shows one type of color television receiver, but it is to be understood that many variations are possible without departing from the essential spirit of the invention. For example, the sections up to the luminance channel may be of the so-called "intercarrier" type which is more fully explained in "Elements of Television Systems" (Prentice-Hall) by G. E. Anner beginning at page 604.

Figure 2:
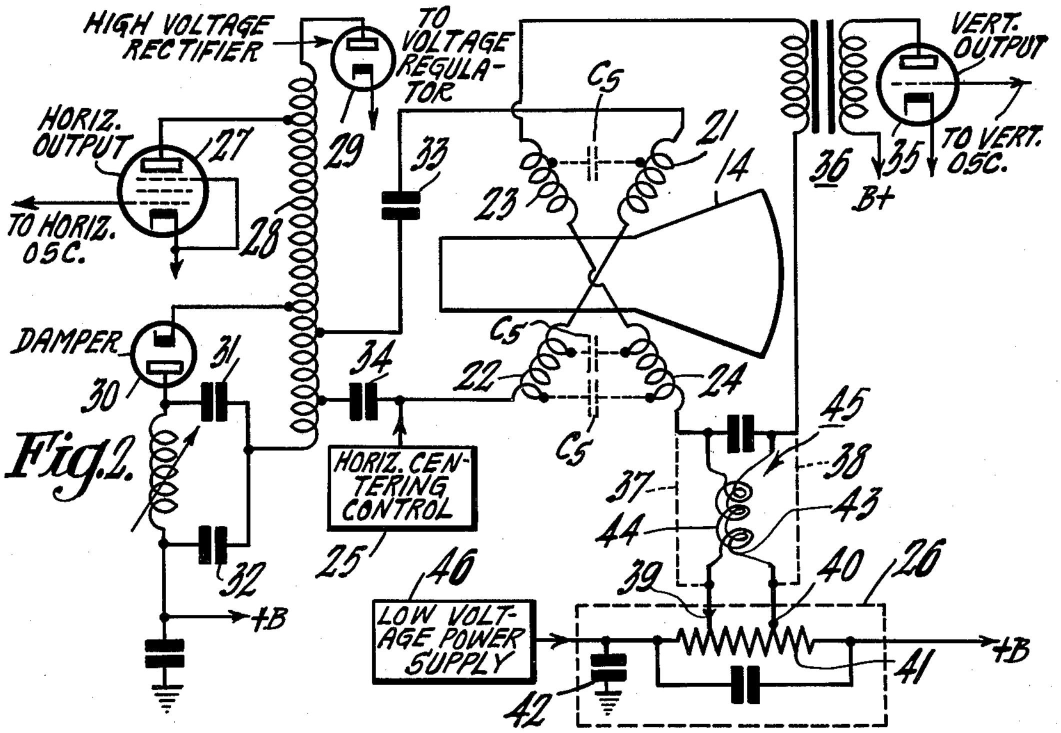
Figure 2 depicts schematically one form of the invention as used in the circuit of the vertical deflection windings.

Figure 2 shows in more detail the inter-relation of some of the circuitry of horizontal and vertical deflection generators 19 and 20, horizontal and vertical centering controls 25 and 26, and windings 21, 22, 23 and 24. A horizontal oscillator is coupled to the input of tube 27 which is the horizontal output driver. The plate of tube 27 is coupled to high voltage transformer 28. A high voltage rectifier stage 29 is also coupled to one end of transformer 28. The cathode of a damper tube 30 is connected to a tap in the transformer 28 and the plate is connected for A. C. through capacitors 31 and 32 to the other end of transformer 28 and to ground. For D. C. the plate of tube 30 is connected through a coil to B+. From taps at other points of transformer 28, energy is applied through condensers 33 and 34 to the windings 21 and 22 which are the horizontal windings of the deflection yoke. Horizontal centering control circuit 25 supplies a variable amount of D. C. through windings 21 and 22 for centering purposes. In one form the horizontal centering control circuit 25 may be coupled to the circuit as shown and explained in connection with Figure 2.

A vertical oscillator (not shown) is coupled to the input electrode of a vertical output tube 35 whose plate is coupled to the primary of vertical output transformer 36. The secondary of transformer 36 is coupled to the vertical windings 23 and 24. Heretofore it has been customary to connect the windings 23 and 24 through non-reactive means or directly to the moveable arm 39 and the fixed tap 40 as shown by the dashed line connections 37 and 38.

Between the windings 23 and 24 and the windings 21 and 22, a certain amount of stray capacity exists and is represented by the dashed line condensers labeled Cs. In Figure 2 the effect of the stray capacity Cs existing between the horizontal and vertical windings is to couple A. C. energy from the horizontal windings 21 and 22 to the vertical windings 23 and 24. In the customary circuit the A.-C. in windings 21 and 22 sees little impedance to A.-C. ground since energy capacitively coupled to windings 23 and 24 has a relatively unimpeded path via connections 37 and 38 through the resistance of centering potentiometer 41 and through capacitor 42 to ground.

In this form of the invention, instead of returning the vertical windings 23 and 24 to the vertical centering potentiometer 41 in the vertical centering control 26 directly through connections 37 and 38, they are instead coupled through inductances such as inductances 43 and 44 which may be the windings of a bifilar transformer 45, for example.

Since the effect of the stray capacity Cs is to increase the effective capacity in the horizontal windings, which may be represented by an equivalent parallel resonant circuit, the frequency of the horizontal sawtooth decreases so that the return or retrace time of the sawtooth is increased and less second anode voltage is generated. By placing the additional inductance in the vertical windings, the stray capacity no longer provides a direct path through the vertical windings to centering potentiometer 41 and to A. C. ground for the frequencies from the horizontal deflection circuit. Effectively the stray capacitance and the inserted inductances, such as inductor 45 are in series and the horizontal A. C. now sees a high impedance to ground. This reduces the effective capacity of the deflecting yoke resulting in shorter return time and increased anode power output.

A low voltage power supply 46 is coupled to one end of potentiometer 41. The box 26 is intended to show some of the circuitry that may be used to provide vertical centering control, although it is to be understood that many variations are possible.

Since different impedance levels exist between the vertical windings and the horizontal windings due to the stray capacity Cs, the amounts of currents transferred from the horizontal to the vertical will differ at different points in the vertical windings. This causes ringing in the vertical deflection sawtooth and consequent displacement of the horizontal scanning line on the left side of the raster. In the three gun color kinescope 14, each beam is displaced differently in the vertical direction. Consequently the position of the scanning beam for each color at the beginning of each line of the raster is diverted from its normal position. A "rainbow effect" may be visible at the left hand side of the raster for a lateral distance of about one inch. The amount will vary substantially with the deflection system used. This reduces the usable area of the color kinescope and the added inductances 43 and 44 tend to prevent this phenomenon.

While a bifilar inductance such as inductance 15 possesses relatively low capacity and performs very efficiently, the present invention is not limited to use of such an inductance. Two ordinary inductances could be used instead but greater inductance values for each of them would probably be required. In addition, the inductances theoretically should be matched very closely which would entail greater expense than bifilar wound types.

Figure 3:
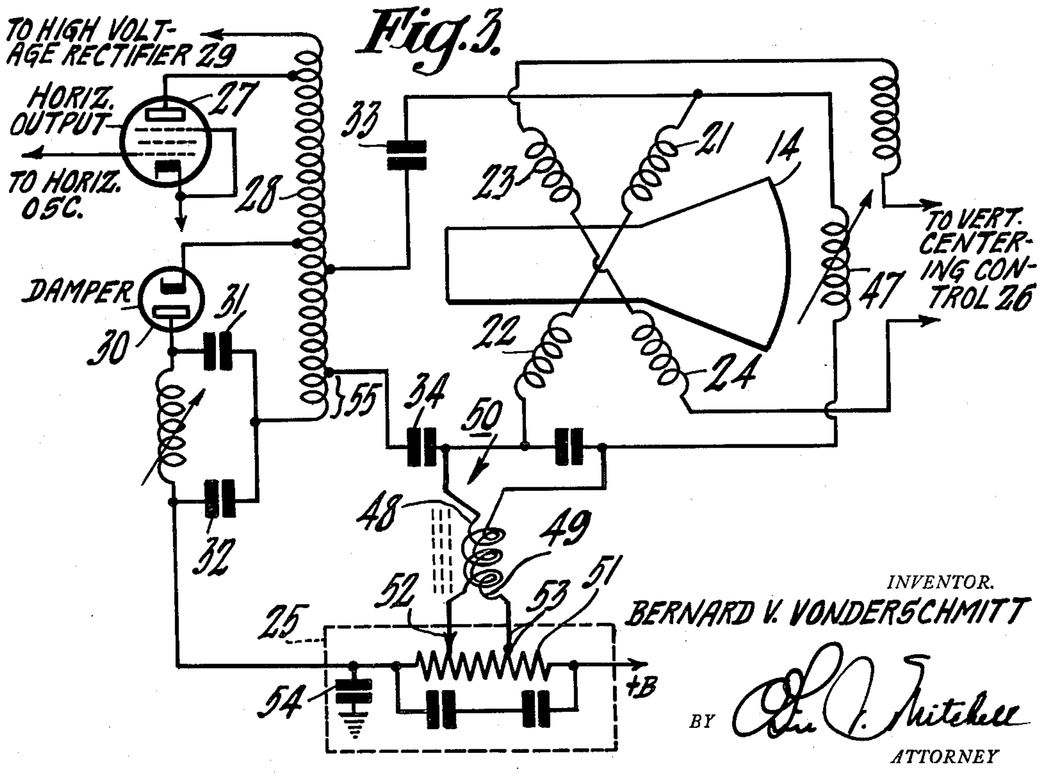
Figure 3 depicts schematically another form of the invention as used in the circuit of the horizontal deflection windings.

Figure 3 illustrates the use of inductances placed intermediate the horizontal windings and the horizontal centering control. A horizontal driver tube 27 actuated by pulses from a horizontal oscillator (not shown) is coupled to transformer 28 as in Figure 2. The plate of damping tube 30 is connected to the transformer 28 as in Figure 2 through condensers 31 and 32 and to one end of potentiometer 51. The vertical windings 23 and 24 are coupled to the vertical centering control 26 as shown in Figure 2. A variable width control coil 47 is effectively in parallel with horizontal windings 21 and 22. The latter windings are energized through condensers 33 and 34 as shown previously in Figure 2. Between the horizontal windings 21 and 22 and the horizontal centering control shown by box 25 two inductances 48 and 49 which may be the windings of a bifilar wound transformer 50, for example, are interposed. The centering control 25 may include a horizontal centering potentiometer 51 having a moveable arm 52 and a fixed tap 53 to which inductances 48 and 49 are connected. As stated above, the windings 48 and 49 may be individual inductances which are preferably matched very closely. This arrangement permits D.-C. to be applied to the horizontal windings and has the added advantage of providing an impedance to prevent shorting out the section 55 of the transformer 28 insofar as A.-C. is concerned.

The invention claimed is:

1. A cathode ray deflection system comprising in combination, first means for deflecting said cathode ray electromagnetically in a first direction, second means for deflecting said cathode ray electromagnetically in a second direction, said first and second deflecting means being adapted to be energized by currents having an A.-C. component, each of said currents having frequencies considerably different from one another, a source of D.-C., and at least one inductive means coupled to said source for applying said D.-C. to at least one of said deflecting means, said inductive means being adapted to prevent interaction of the currents in said first and second deflecting means.

2. A cathode ray deflection system comprising a first inductive means for deflecting said ray in a first direction, a second inductive means for deflecting said ray in a second direction, a source of direct current, and third inductive means coupled to said source for applying said D.-C. to one of said deflecting means, said third inductive means being adapted to present a high A.-C. impedance to currents in the other of said inductive deflecting means to which it is not coupled.

3. A cathode ray deflection system including a first electromagnetic deflection means for deflecting said ray horizontally, a second electromagnetic deflecting means for deflecting said ray vertically, a source of D.-C., and means for applying said D.-C. to said vertical deflecting means, said applying means including an inductance, said inductance being adapted to present a high impedance to currents in said horizontal deflecting means.

4. A cathode ray tube deflecting system comprising a horizontal deflection inductance, a vertical deflection inductance, said inductances being in proximity to one another, a source of D.-C. current, said source including a potentiometer having one terminal substantially at A.-C. ground potential, and means coupled to said potentiometer and to said vertical deflection inductance for applying said D.-C. to said vertical deflection inductance for centering purposes, said applying means including a high impedance to currents in said horizontal deflection inductance, said applying means thereby isolating said vertical deflection inductance from the A.-C. ground potential terminal of said potentiometer for suppressing A.-C. current flow from said horizontal deflection inductance through said vertical deflection inductance to said A.-C. ground potential.

5. The invention as described in claim 4 wherein said applying means includes a bifilar wound inductance.

6. A cathode ray deflecting system comprising, a horizontal deflection inductance containing a plurality of windings in series, a vertical deflection inductance containing a plurality of windings in series, said horizontal and vertical inductances being in proximity to one another, said horizontal inductance being energized by currents having frequencies much higher than the frequencies of currents which energize said vertical inductance, a source of D.-C. current, said source including a potentiometer one of whose terminals is effectively at A.-C. ground with respect to the currents in said horizontal inductance, a first inductance coupled to one end of said plurality of vertical windings and to a point on said potentiometer, and a second inductance coupled to the other end of said plurality of vertical windings and to another point on said potentiometer, said first and second inductances adapted to apply said D.-C. to said vertical deflection inductance for centering purposes, said first and second inductances having essentially identical electrical characteristics, said first and second inductances operating to present a high impedance to currents in said horizontal inductance so as to minimize the flow of currents having frequencies of the same order as those in said horizontal windings through said vertical windings to said effective A.-C. ground.

7. The invention as described in claim 6 wherein said first and second inductances are the two windings of a bifilar wound inductance.

8. A cathode ray tube deflecting system comprising, a horizontal deflection inductance containing a plurality of windings in series, a vertical deflection inductance containing a plurality of windings in series, said horizontal and vertical inductances being in proximity to one another, a source of D.-C., said source including a potentiometer, a first inductance coupled to one end of said plurality of series horizontal windings and to a point on said potentiometer, and a second inductance coupled to the other end of said plurality of horizontal series windings and to another point on said potentiometer, said first and second inductances being adapted to apply said D.-C. to said horizontal inductance, said first and second inductances having essentially identical electrical characteristics.

9. A cathode ray tube deflection system comprising in combination a horizontal deflection inductance, said horizontal inductance adapted to be energized by relatively high frequency currents, a vertical deflection inductance placed in proximity to said horizontal inductance, said vertical inductance adapted to be energized by relatively low frequency currents, a resistance element, one terminal of said resistance element being coupled to an effective A.-C. ground potential, a first inductance coupled to one end of said horizontal inductance and to a point on said resistance element, and a second inductance coupled to the other end of said horizontal inductance and to a different point on said resistance element, said first and second inductances having essentially identical electrical characteristics and being adapted to apply D.-C. from said resistance element to said horizontal winding.

References Cited in the file of this patent

UNITED STATES PATENTS

| | | |
|---|---|---|
| 2,534,557 | Ostreicher | Dec. 19, 1950 |
| 2,644,103 | Flyer et al. | June 30, 1953 |